United States Patent
Nakashima

(10) Patent No.: US 7,014,564 B2
(45) Date of Patent: Mar. 21, 2006

(54) POWER TRANSMISSION DEVICE

(75) Inventor: Masafumi Nakashima, Anjo (JP)

(73) Assignee: Denso Corporation, Kariya (JP)

( * ) Notice: Subject to any disclaimer, the term of this patent is extended or adjusted under 35 U.S.C. 154(b) by 25 days.

(21) Appl. No.: 10/751,528

(22) Filed: Jan. 6, 2004

(65) Prior Publication Data

US 2004/0137989 A1     Jul. 15, 2004

(30) Foreign Application Priority Data

Jan. 10, 2003    (JP) ............................. 2003-003855

(51) Int. Cl.
*F16D 9/008* (2006.01)
(52) U.S. Cl. ........................... 464/32; 464/85; 474/903
(58) Field of Classification Search ................... 464/32, 464/76, 85, 182; 474/70, 94, 902, 903; 411/389; 417/223, 319
See application file for complete search history.

(56) References Cited

U.S. PATENT DOCUMENTS

| | | | | |
|---|---|---|---|---|
| 687,676 A | * | 11/1901 | Culver | ................... 464/182 X |
| 3,082,933 A | * | 3/1963 | Bernard | ....................... 417/319 |
| 2003/0130044 A1 | * | 7/2003 | Kanai et al. | ................... 464/32 |

FOREIGN PATENT DOCUMENTS

JP     A-2001-173759     6/2001

* cited by examiner

*Primary Examiner*—Greg Binda
(74) *Attorney, Agent, or Firm*—Posz Law Group, PLC

(57) ABSTRACT

When the connecting rod 10 made of material of high strength, the mechanical strength of which is higher than that of the inner hub 22, is incorporated into between the cylindrical boss portion 31 of the inner hub 22 and the compressor shaft 2, an outer diameter of the compressor shaft 2 can be made to be smaller than that of the conventional fastening profile. Even when the outer diameter of the compressor shaft 2 is reduced, it is possible to solve the problem of lack of the mechanical strength of the inner circumferential screw portion 35, 44 and the outer circumferential screw portion 43, 3 with respect to the axial fastening force given to the inner circumferential screw portion 35, 44 and the outer circumferential screw portion 43, 3.

9 Claims, 4 Drawing Sheets

POWER TRANSMISSION DEVICE

BACKGROUND OF THE INVENTION

1. Field of the Invention

The present invention relates to a power transmission device for transmitting rotational power, which is generated by an engine, from the engine to engine accessories. More particularly, the present invention relates to a power transmission device having a torque limiter mechanism to shut off a power transmission path from the engine to the engine accessories when an overload torque is given to the engine, for example, when a drive shaft of driving the engine accessories is locked for the reason of seizure and so forth.

2. Description of the Related Art

In a conventional refrigerating cycle having a variable displacement type refrigerant compressor, which will be referred to as a compressor hereinafter, in which a discharge capacity of discharging the refrigerant can be changed to 0% of the compressor capacity, it is unnecessary to provide a clutch mechanism which connects and disconnects the transmission of rotational power (torque) from the engine to a drive shaft of the refrigerant compressor. However, in the case where the clutch mechanism is not provided, if the compressor shaft is locked by seizure of the compressor, an overload torque (impact torque), the intensity of which is much higher than the intensity of usual transmission torque, is generated. Due to the above overload torque, the rotation of a V-belt pulley to drive the compressor shaft is stopped. Accordingly, the V-belt driven by the engine slips, which causes abrasion of the V-belt. Further, the V-belt is heated. As a result, there is a possibility that the V-belt is broken.

In order to solve the above problems, a compressor-pulley device is proposed, for example, in Japanese Unexamined Patent Publication No. 2001-173759, by which a power transmission path from the engine to the compressor is shut off when a difference in torque between the pulley and the compressor shaft exceeds a setting torque when an overload torque is generated for the reason of lock of the compressor shaft. As shown in FIG. 4, this torque limiter is composed in such a manner that rotational power of the engine transmitted from the engine to the compressor shaft is transmitted from the pulley (not shown) to the compressor shaft 103 via the rubber damper (not shown), the outer hub 101 made of resin and the inner hub 102 made of metal.

A connecting portion of connecting this inner hub 102 with the shaft 103 is composed in such a manner that the male screw portion 104 provided on the outer circumference of the forward end portion of the compressor shaft 103 is screwed to the female screw portion 106 provided in the cylindrical boss portion 105 of the inner hub 102 which is formed by means of insert molding on the inner circumferential side of the outer hub 101 of the compressor-pulley device. This inner hub 102 is made of metal and is formed by means of integral molding. In the case where an excessively high torque is given when the compressor shaft is locked, the bridge portion 107 of the inner hub 102 is broken. In this way, the torque limiter mechanism fulfills its function.

In this structure, the shoulder portion front end face 111 of the compressor shaft 103 and the boss portion rear end face 112 of the inner hub 102 come into face-contact with each other in which the contact face is formed into an annular shape, and this contact portion composes a stopper. An axial fastening force of fastening the male screw portion 104 to the female screw portion 106, which is generated by the rotational power of the engine and transmitted through the pulley, is received by the stopper face. Due to this structure, the inner circumference of the boss portion 105 of the inner hub 102 can be fastened to the outer circumference of the forward end portion of the compressor shaft 103 by a predetermined fastening axial force (fastening torque). Therefore, even when the rotation fluctuates, the occurrence of rattling in the rotational direction can be avoided. Accordingly, reliability of the compressor-pulley device can be enhanced.

In this connection, from the viewpoint of global environmental protection, they have been recently developing a refrigerating cycle of the air-conditioner for vehicle use in which carbon dioxide ($CO_2$) is used as the refrigerant. Compared with a refrigerant such as fluorocarbon and chlorofluorocarbon, the working pressure of carbon dioxide is high. Therefore, even in the case of equalization pressure in which the refrigerating cycle is not used, pressure of this refrigerant of carbon dioxide is high. In the case of an open type compressor, the shaft is given a force by the inner pressure so that the shaft is pushed outside from the front wall face of the housing. Accordingly, when $CO_2$ is used for the refrigerating cycle in which the compressor-pulley device having the torque limiter mechanism is used, a force given to the shaft in the direction of the outside of the compressor becomes stronger than that in the case of the conventional fluorocarbon or chlorofluorocarbon. Accordingly, a power loss caused in the thrust bearing, which is built in the compressor, is increased.

A shaft seal conducts sealing while the shaft seal squeezes a sliding face. This squeezing force is increased when the inner pressure increases. Therefore, the power loss is also increased in this case. Accordingly, the power loss in the case of OFF-operation of the refrigerating cycle is increased. In order to reduce the power loss described above, an outer diameter of the shaft of the compressor may be reduced. When the outer diameter of the shaft of the compressor is reduced, a sectional area of the shaft is decreased, and a force which pushes the shaft in the direction of the outside of the housing, is reduced, so that a load given to the thrust bearing can be decreased. Further, a contact area and contact length of the shaft seal can be reduced, so that the power loss can be decreased.

However, when the outer diameter of the compressor shaft is reduced in the constitution of the prior art, sizes of the male and the female screw portion in the connecting portion of connecting the inner hub with the shaft are decreased, and the mechanical strength of the male and the female screw portion becomes insufficient with respect to the fastening axial force. Further, a contact area of the stopper between the shaft and the inner hub is reduced, and buckling may be caused. For the above reasons, it is not appropriate that the outer diameter of the compressor shaft is simply reduced. On the other hand, it is possible to think that the mechanical strength of material composing the inner hub is increased, however, the inner hub is formed by a mechanical strength in which consideration is given to the torque limiter mechanism. Therefore, it is impossible to adopt the aforementioned structure.

SUMMARY OF THE INVENTION

An object of the present invention is to provide a power transmission device characterized in that: a connecting rod made of material, the mechanical strength of which is higher than that of the hub member, is incorporated into between the hub member rotated by the engine and the drive shaft to drive the engine accessories, so that the mechanical strength of the fastening portion, in which the hub member and the drive shaft of the engine accessories are fastened to each other, can be ensured even if the outer diameter of the drive shaft of the engine accessories is reduced. Another object of the present invention is to provide a power transmission device in which a power loss caused when power is transmitted from the engine to the engine accessories can be reduced.

According to an aspect of the present invention, a power transmission device for transmitting rotational power from the engine to the engine accessories includes: an annular hub member rotated by the engine; and a connecting rod incorporated into between the drive shaft of the engine accessories and the hub member. Rotational power is transmitted from the hub member to the connecting rod by the fastening in which an inner circumferential screw portion formed on the inner circumference of the hub member and a first screw portion formed in the connecting rod are fastened to each other. Rotational power is transmitted from the connecting rod to the drive shaft of the engine accessories by the fastening in which a second screw portion formed in the connecting rod and an outer circumferential screw portion formed on an outer circumference of the forward end of the drive shaft are fastened to each other. When material, the mechanical strength of which is higher than that of the hub member, is used for the connecting rod, an outer diameter of the drive shaft of the engine accessories can be made smaller than that of the conventional structure in which the inner hub and the shaft are fastened to each other.

Due to the foregoing, even if the outer diameter of the drive shaft of the engine accessory is reduced, when the connecting rod is incorporated into between the hub member and the drive shaft, the mechanical strength of the fastening portion of fastening the hub member to the drive shaft of the engine accessory can be ensured. Due to the above structure, the cross sectional area of the drive shaft of the engine accessory is decreased, and an intensity of the force given to the drive shaft in the direction of the outside of the housing can be reduced. Therefore, a load given to the bearing (thrust bearing) built into the engine accessory can be reduced. Concerning the shaft seal of the engine accessory, as the contact area and the sliding length can be reduced, a power loss caused when power is transmitted from the engine to the drive shaft of the engine accessory can be reduced. When a profile of the fastening portion of fastening the hub member to the connecting rod is made to be the same as that of the conventional fastening portion of fastening the inner hub to the shaft, the assembling jig or the fastening tool of the same profile can be used in common. Therefore, the manufacturing cost can be reduced compared with a case in which the assembling jig and the fastening tool are newly made.

According to another aspect, rotational power is transmitted from the hub member to the connecting rod by the fastening of the inner circumferential screw portion, which is formed on the inner circumference of the cylindrical boss portion of the hub member, to the male screw portion which is formed on the outer circumference of a first engaging portion of the connecting rod. Rotational power is transmitted from the connecting rod to the drive shaft of the engine accessory by the fastening of the female screw portion, which is formed on the inner circumference of a second engaging portion of the connecting rod, to the outer circumferential screw portion which is formed on the outer circumference of the forward end of the drive shaft. Due to the above structure, rotational power can be stably transmitted from the engine to the drive shaft of the engine accessory.

According to still another aspect of the present invention, by the fastening axial force of fastening the inner circumferential screw portion, which is formed on the inner circumference of the cylindrical boss portion of the hub member, to the first screw portion formed in the connecting rod, the connecting rod is fastened and fixed to the inner circumference of the cylindrical boss portion of the hub member so that one end face of the cylindrical boss portion of the hub member in the axial direction can be closely contacted with a first receiving mount face of the connecting rod. Due to the above structure, one end face of the cylindrical boss portion in the axial direction is engaged with the first receiving mount face of the connecting rod. Therefore, the cylindrical boss portion is prevented from moving to one side in the axial direction.

By the fastening axial force of fastening the female screw portion, which is formed in the connecting rod, to the outer circumferential screw portion which is formed on the outer circumference of the forward end of the drive shaft of the engine accessory, the connecting rod is fastened and fixed to the outer circumference of the forward end of the drive shaft of the engine accessory so that other end face of the drive shaft in the axial direction can be closely contacted with a second receiving mount face of the connecting rod. Due to the above structure, the other end face of the drive shaft of the engine accessory in the axial direction is engaged with the second receiving mount face of the connecting rod. Therefore, the drive shaft of the engine accessory is prevented from moving to the other side in the axial direction.

Rotational power is transmitted from the hub member to the connecting rod by the fastening of the inner circumferential screw portion, which is formed on the inner circumference of the cylindrical boss portion of the hub member, to the male screw portion formed in the connecting rod and also by the close contact of the first receiving mount face of the connecting rod with one end face of the cylindrical boss portion in the axial direction. Rotational power is transmitted from the connecting rod to the drive shaft of the engine accessory by the fastening of the female screw portion, which is formed in the connecting rod, to the outer circumferential screw portion formed on the outer circumference of the forward end of the drive shaft and also by the close contact of the second receiving mount face of the connecting rod with the other end face of the drive shaft in the axial direction. Due to the foregoing, rotational power can be stably transmitted from the engine to the drive shaft of the engine accessory.

According to still another aspect of the present invention, in the case of disconnecting the hub member from the connecting rod, after the locking portion of the connecting rod has been fixed with a holding tool, the hub member is rotated with a fastening tool so that the hub member can be loosened from the connecting rod. Due to the foregoing, the hub member can be easily disconnected from the connecting rod without causing an idle rotation of the connecting rod. According to still another aspect of the invention, in the case of disconnecting the connecting rod from the drive shaft of the engine accessory, after the locking portion of the drive shaft of the engine accessory is fixed with a holding tool, the connecting rod is rotated with the fastening tool so that the connecting rod can be loosened from the drive shaft of the engine accessory. Due to the foregoing, the connecting rod can be easily disconnected from the drive shaft of the engine accessory without causing an idle rotation of the drive shaft of the engine accessory.

According to still another aspect of the present invention, when an overload torque, the intensity of which is much higher than the intensity of the normal transmission torque, is generated on the output disk, which is connected with the outer circumference of the connecting rod, the power transmission path from the input disk to the output disk is shut off. Due to the foregoing, the input disk can be rotated. Therefore, the input disk is driven. Accordingly, neither the chain nor the belt slips. Therefore, no abrasion is caused in those components. As the chain and the belt are not heated by slippage, there is no possibility that the chain and the belt are broken.

According to still another aspect of the present invention, the inner circumferential screw portion is formed on the inner circumference of the cylindrical boss portion of the substantially annular metallic disk which is integrally formed on the inner circumferential side of the substantially annular resin disk. Due to the above structure, the mechanical strength of the inner circumferential screw portion can be enhanced compared with a case in which the inner circumferential screw portion is provided on the inner circumference of the resin disk.

According to still another aspect of the present invention, between the inner wall face of the recessed engaging portion provided on the input disk and the outer wall face of the protruding engaging portion provided on the output disk, the rubber elastic body is arranged, by which a fluctuation of torque transmitted from the input disk to the output disk can be absorbed. Due to the above structure, only when the damper portion of the output disk is positioned in the rotational direction, the output disk can be assembled to the drive shaft of the engine accessory. Therefore, the assembling property and the productivity can be enhanced.

According to still another aspect of the present invention, the engine accessory may be one or more of the compressor for circulating refrigerant in the refrigerating cycle, the alternator for electrically charging the electric power source mounted on a vehicle, the water pump for generating a circulating current of cooling water in the cooling water circuit, the hydraulic pump for generating hydraulic pressure in the hydraulic control circuit or in the lubricating circuit and the blower for generating an air current.

The present invention may be more fully understood from the description of preferred embodiments of the invention, as set forth below, together with the accompanying drawings.

DESCRIPTION OF THE PREFERRED EMBODIMENTS (Constitution of the Embodiment)

Figure 1:
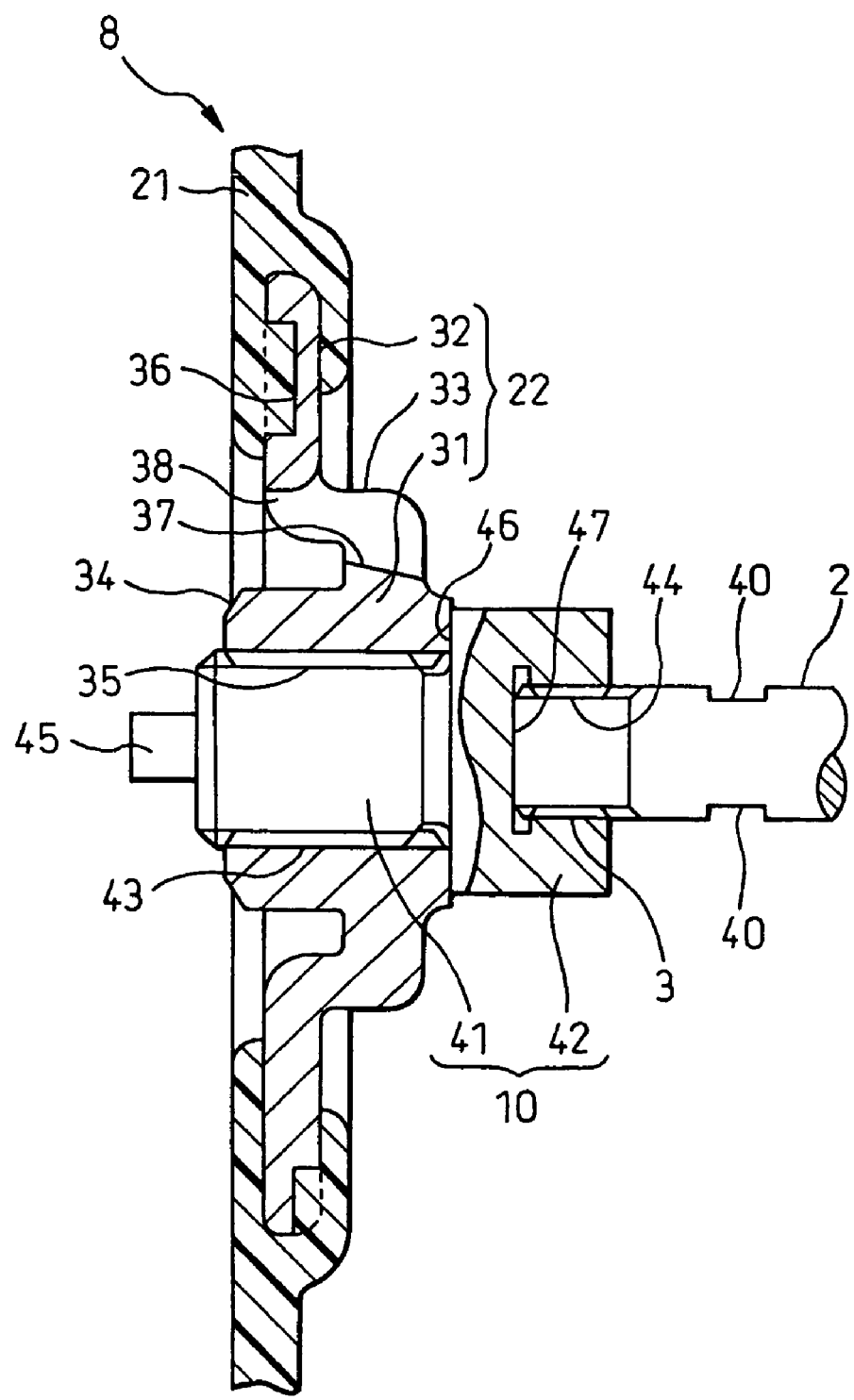
FIG. 1 is a sectional view showing a fastening profile of an embodiment of the present invention in which the cylindrical boss portion of the inner hub and the first engaging portion of the connecting rod are fastened to each other and also showing a fastening profile in which the second engaging portion of the connecting rod and the forward end portion of the compressor shaft are fastened to each other.
Figure 2:
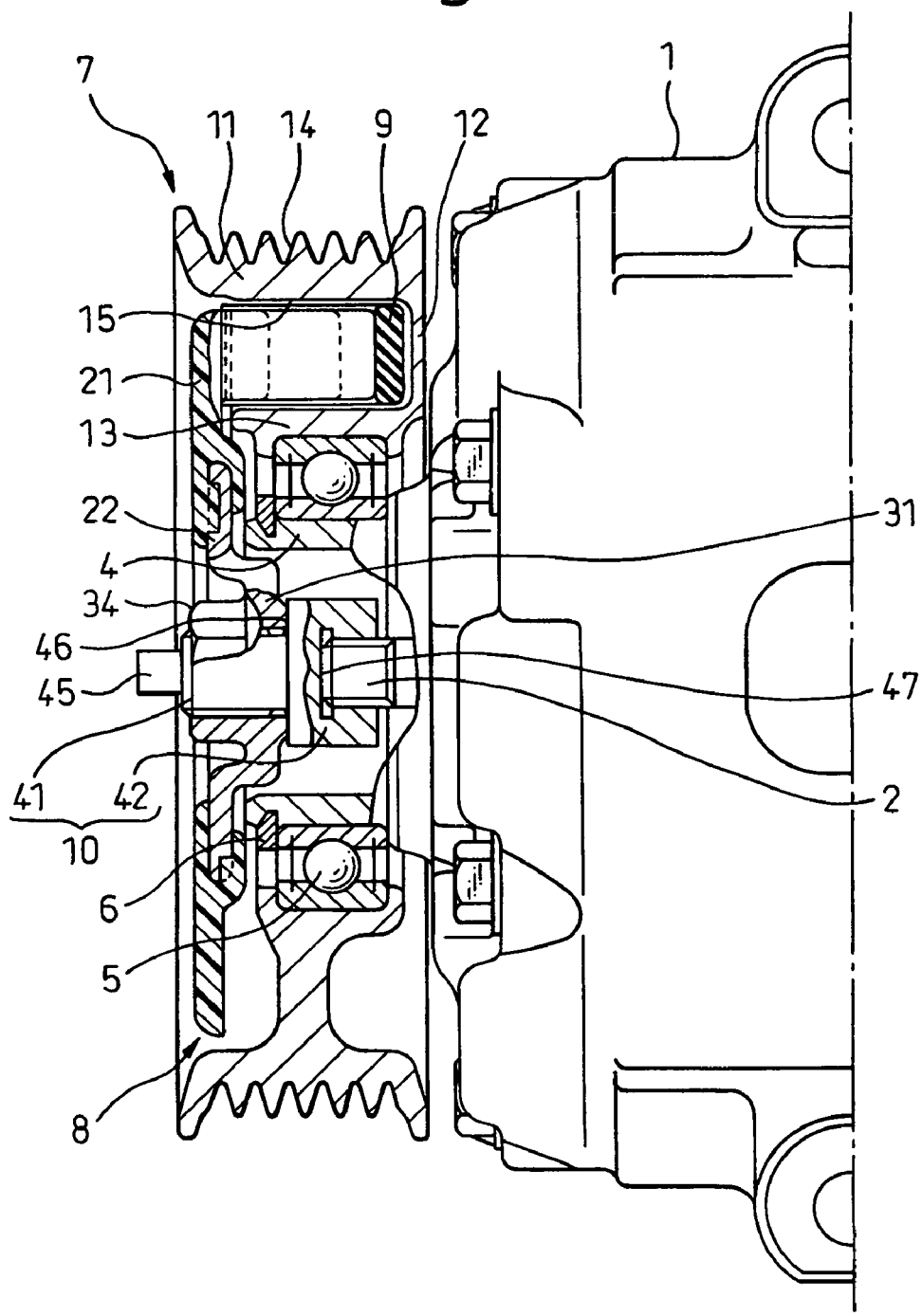
FIG. 2 is a sectional view showing a compressor-pulley device of an embodiment of the present invention.

FIGS. 1 to 4 are views showing an embodiment of the present invention. FIG. 1 is a sectional view showing a fastening profile of an embodiment of the present invention in which the cylindrical boss portion of the inner hub and the first engaging portion of the connecting rod are fastened to each other and also showing a fastening profile in which the second engaging portion of the connecting rod and the forward end portion of the compressor shaft are fastened to each other, and FIG. 2 is a sectional view showing a compressor-pulley device.

The compressor-pulley device of this embodiment is a power transmission device arranged in an engine compartment of a vehicle such as an automobile on which an internal combustion engine (referred to as an engine hereinafter) is mounted, and the power transmission device transmits rotational power from the engine to an engine accessory which will be referred to as a compressor hereinafter. This power transmission device is provided with a torque limiter mechanism described later. The compressor used in this embodiment is a component composing a refrigerating cycle of the air-conditioner for vehicle use. This compressor is a variable displacement type refrigerant compressor including: a refrigerant compressing portion (not shown); a discharge capacity changing means (not shown) for changing a discharge capacity to 0%; and a cylindrical compressor housing (referred to as a housing hereinafter) 1 in which the refrigerant compressing portion and the discharge capacity changing means are accommodated.

When the compressor shaft 2 is rotated, the refrigerant compressing portion compresses and discharges the sucked refrigerant (for example, carbon dioxide: $CO_2$). For example, the housing 1 includes: a front housing; a cylinder; and a rear housing, wherein these components are arranged in this order from the compressor-pulley device side. Between the inner circumference of the bearing portion (not shown) of the housing 1 and the outer circumference of the shaft 2, the thrust bearing (not shown) for pivotally supporting the shaft 2 and the shaft seal (not shown) for sealing the inside from the outside while the shaft seal is squeezing the outer circumference (sliding face) of the shaft are attached.

The compressor shaft 2 corresponds to the drive shaft of the present invention. A forward end portion of the shaft 2 is engaged with the connecting rod 10. As shown in FIGS. 1 and 2, an outer circumferential screw portion (male screw portion) 3 for connecting the compressor-pulley device is formed on the outer circumference of the forward end portion of the shaft 2. On an outer circumferential face of the shaft 2 on the housing 1 side of the connecting rod 10, that is, on an outer circumferential face of the shaft 2 protruding forward from the front wall face of the housing 1, the locking portion 40 is provided in order to prevent the shaft 2 from rotating when the connecting rod 10 is rotated in a direction in which the connecting rod would be loosened with respect to the shaft 2.

At the front end portion of the housing 1, a cylindrical sleeve 4 is integrally formed in such a manner that the sleeve 4 protrudes from the central portion toward the outside in the axial direction. A ball bearing 5 is held on the outer circumference of this sleeve 4. In this connection, a circlip 6 is engaged with the outer circumference of the sleeve portion 4 so that the ball bearing 5 can be engaged in the annular step portion of the housing 1.

This compressor-pulley device is a V-belt pulley device including: a V-belt pulley body (input disk, referred to as a rotor hereinafter) 7 rotating at all times when the engine is driven; an output disk 8 rotating when torque is transmitted from the rotor 7 to the output disk 8; a plurality of rubber dampers 9 (six rubber dampers 9 in this embodiment)

attached between the rotor 7 and the output disk 8; and a connecting rod 10 connected between the output disk 8 and the compressor shaft 2.

The rotor 7 is made of, for example, a metallic material such as iron, a thermo-setting type resin material such as phenol resin, and a metallic material such as aluminum. This rotor 7 is integrally formed into a predetermined substantially annular shape. This rotor 7 includes: a cylindrical wall portion 11, the profile of which is substantially cylindrical, which is driven by the engine at all times; a side wall portion 12 arranged on the inner diameter side of the cylindrical wall portion 11; and a bearing holding portion 13 arranged on the inner diameter side of this side wall portion 12. In this connection, the bearing holding portion 13 is held on the outer circumferential side of the ball bearing 5.

A multiple stage V-belt (not shown) is wound round the outer circumference of the cylindrical wall portion 11 of the rotor 7. Therefore, on the outer circumference of the cylindrical wall portion 11, a plurality of V-shaped grooves 14 corresponding to the plurality of V-shaped grooves, which are formed on the inner circumferential face of the V-belt, are formed. This V-belt is provided between the crank pulley (not shown), which is attached to the crank shaft of the engine, and the cylindrical wall portion 11 of the rotor 7. In this connection, the V-belt is wound round not only the compressor pulley device but also the V-belt pulley devices of the other engine accessories such as an alternator, a water pump of the engine cooling device, a hydraulic pump of the power steering device and so forth.

On the side wall 12 of the rotor 7, a plurality of holes 15 formed in the axial direction (six holes 15 formed in the axial direction in this embodiment) are provided, to which a plurality of rubber dampers 9 are respectively attached. The plurality of holes 15 formed in the axial direction correspond to the recessed engaging portion of the present invention. The plurality of holes 15 formed in the axial direction are provided at regular intervals in the circumferential direction (for example, at the interval of 60°). On both inner wall faces in the circumferential direction of the plurality of holes 15 formed in the axial direction, a pair of protrusions 15a are formed so that the plurality of rubber dampers 9 can be deformed being compressed. In this connection, the opening side of the pair of protrusions 15a is formed into a tapered shape or a spherical shape so that the rubber dampers 9 can be easily inserted into the holes 15 formed in the axial direction.

The output disk 8 is a hub member arranged on the front side of the side wall 12 of the rotor 7 being opposed to the front wall face of the side wall 12. This output disk 8 includes: an outer hub 21 made of resin arranged on the outer circumferential side (the outer diameter side) of the output disk 8; and an inner hub 22 made of metal connected with the outer circumference of the compressor shaft 2.

The outer hub 21 corresponds to the resin disk of the present invention. For example, the outer hub 21 is made of thermo-plastic resin such as nylon resin or thermo-setting resin such as phenol resin. This outer hub 21 is integrally formed into a substantially annular shape. As shown in FIG. 2, a plurality of protruding engaging portions (damper portions) 23 (six protruding engaging portions in this embodiment), which protrude to the right in the drawing and loosely engage with the holes 15 formed in the axial direction, are provided in the circumferential direction at regular intervals (for example, at intervals of 60°).

The inner hub 22 corresponds to the metallic disk of the present invention. The inner hub 22 is made of, for example, sintered metal, cast iron or cast aluminum and is integrally formed into a substantially annular shape. The inner hub 22 is formed on the inner circumferential side of the outer hub 21 by means of insert molding (integral resin molding). This inner hub 22 includes: an inner ring 31, which will be referred to as a cylindrical boss portion hereinafter, arranged on the inner circumferential side (the inner diameter side) of the inner hub 22; an outer ring 32 arranged on the outer circumferential side (the outer diameter side) of this cylindrical boss portion 31; and a plurality of bridge portions 33 (three bridge portions 33 in this embodiment) for connecting the cylindrical boss portion 31 with the outer ring 32.

As shown in FIGS. 1 and 2, on the front end face (the left end face in the drawing) of the central portion of the cylindrical boss portion 31, the hexagonal portion (the engaging portion) 34, with which a fastening tool for fastening and fixing the inner hub 22 is engaged, is formed on the outer circumference of the compressor shaft 2. On the inner circumference of this cylindrical boss portion 31, that is, on the inner circumference of the hexagonal portion 34, as shown in FIGS. 1 and 2, the inner circumferential screw portion (the female screw portion) 35 is formed which is screwed to the outer circumferential screw portion 43 provided on the outer circumference of the first engaging portion 41 of the connecting rod 10. Surfaces (connecting portions) of the outer ring 32 and the plurality of bridge portions 33 are covered with resin material composing the outer hub 21. A plurality of circular holes 36 (12 circular holes 36 in this embodiment), by which a binding force of binding resin material composing the outer hub 21 is enhanced, are provided in the outer ring 32. These circular holes 36 are formed in the circumferential direction at regular intervals (for example, at intervals of 30°).

The plurality of bridge portions 33 are radially arranged in the radial direction from the outer circumferential face of the cylindrical boss portion 31 to the inner circumferential face of the outer ring 32. These bridge portions 33 include a plurality of breaking portions 37 (three breaking portions 37 in this embodiment). The stress generated in these breaking portions 37 by the transmission of torque given to the inner hub 22 of the output disk 8 is higher than the stress generated in the other portions. These breaking portions 37 are provided in the root portion of the cylindrical boss portion 31 of the bridge portions 33 and formed between the substantially arcuate through-holes 38 formed in the circumferential direction.

These breaking portions 37 compose a torque limiter mechanism which operates as follows. When an overload torque (For example, the intensity of the torque is 40 Nm.), the intensity of which is much higher than the normal transmission torque (For example, the intensity of the torque is 15 Nm.), is generated in the inner hub 22 of the output disk 8, the outer diameter side and the inner diameter side of the inner hub 22 are separated from each other, so that the power transmission path from the engine to the compressor shaft 2 can be shut off. The plurality of breaking portions 37 are arranged being inclined in such a manner that the diameter of the breaking portions 37 on the compressor side is small with respect to the axis parallel with the compressor shaft 2. The plurality of breaking portions 37 are formed in a region from the front wall face to the rear wall face of the bridge portion 33.

Figure 3:
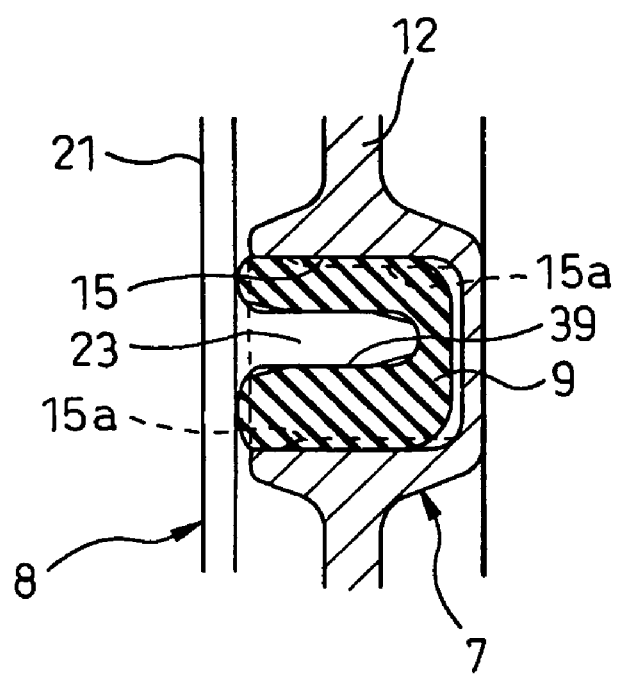
FIG. 3 is a sectional view showing a rubber damper of an embodiment of the present invention.

The plurality of rubber dampers 9 are elastic rubber bodies made of, for example, chlorinated butyl rubber, styrene butadiene rubber or natural rubber. Each rubber damper 9 is formed into a substantial U-shape by means of integral molding. As shown in FIG. 3, the rubber damper 9 has a recessed portion (a recessed portion to be engaged) 39 with which the protruding engaging portion 23, which protrudes backward from the rear wall face of the outer hub 21, is engaged. The plurality of rubber dampers 9 are respectively attached into the laterally U-shaped hollow portions, which are formed between the outer wall faces of the protruding engaging portions 23 of the outer hub 21 and the inner wall faces of the holes 15 formed in the axial direction on the front wall face of the side wall portion 12 of the rotor 7, by means of press-fitting or adhesion. Therefore, the plurality of rubber dampers 9 absorb a torque fluctuation generated when torque is transmitted from the rotor 7 to the output disk 8.

The connecting rod 10 of this embodiment is made of material, the mechanical strength of which is higher than that of the output disk 8 such as, for example, a metallic material such as stainless steel. The connecting rod 10 is integrally formed into a predetermined shape and incorporated into between the compressor shaft 2 and the inner hub 22. This connecting rod 10 includes: a first engaging portion 41 engaged with the inner circumference of the cylindrical boss portion 31 of the inner hub 22; and a second engaging portion 42, the profile of which is cylindrical, having a bottom portion, engaged with the outer circumference of the forward end portion of the compressor shaft 2.

On the outer circumference of the first engaging portion 41, the outer circumferential screw portion (the male screw portion, which corresponds to the first screw portion of the present invention) 43 is formed which is screwed to the inner circumferential screw portion (the female screw portion) 35 provided on the inner circumference of the cylindrical boss portion 31 of the inner hub 22. On the inner circumference of the second engaging portion 42, the inner circumferential screw portion (the female screw portion, which corresponds to the second screw portion of the present invention) 44 is formed which is screwed to the outer circumferential screw portion (the male screw portion) 3 provided on the outer circumference of the forward end portion of the compressor shaft 2. In this connection, the diameters of the outer circumferential screw portion 3 and the inner circumferential screw portion 44 are smaller than the outer diameter of the compressor shaft 2.

On the forward end face (the left end face in the drawing) of the first engaging portion 41, the locking portion 45 is integrally formed in order to prevent the connecting rod 10 from rotating when the output disk 8 is rotated in a direction in which the output disk would be loosened with respect to the connecting rod 10. On the forward end face of the second engaging portion 42 of the connecting rod 10, the first receiving mount face 46, the profile of which is substantially annular, is integrally formed which engages with the rear end face (the right end face in the drawing) of the cylindrical boss portion 31 of the inner hub 22 so as to prevent the cylindrical boss portion 31 from moving backward (to the right in the drawing), the first receiving mount face 46 coming into close contact with the rear end face of the cylindrical boss portion 31.

On the bottom wall face of the second engaging portion 42 of the connecting rod 10, the second receiving mount face 47, the profile of which is substantially circular, is integrally formed which engages with the forward end face (the left end face in the drawing) of the compressor shaft 2 to prevent the shaft 2 from moving forward (to the left in the drawing), the second receiving mount face 47 coming into close contact with the forward end face of the shaft 2. In this connection, the profiles and diameters of the outer circumferential screw portion 43 on the inner hub 22 side of the connecting rod 10 and the first receiving mount face 46, the profile of which is circular, are the same as those of the forward end face 111 in the shoulder portion of the prior art (Refer to FIG. 4.). In the present embodiment, as shown in FIG. 1, the diameter of the second engaging portion 42 on the right of the step portion (the first receiving mount 46) is larger than the diameter of the first engaging portion 41 on the left of the step portion (the first receiving mount face 46).

(Method of Assembling of Embodiment)

Next, referring to FIGS. 1 to 3, a method of assembling the compressor-pulley device to the compressor of the present embodiment will be briefly explained below.

First, a holding tool is engaged with the locking portion 40 of the width across flat so as to prevent the compressor shaft 2 from rotating, and then a fastening tool is engaged with the locking portion 45 of the width across flat. Next, while the fastening tool is being lightly pushed to the compressor side (to the right in the drawing), it is rotated so that the connecting rod 10 can be fastened. In this way, the inner circumferential screw portion 44 provided on the inner circumference of the second engaging portion 42 of the connecting rod 10 and the outer circumferential screw portion 43 provided on the outer circumference of the forward end of the shaft 2 can be fastened to each other by a predetermined fastening axial force (a fastening torque). In this connection, directions of the screw grooves of the outer circumferential screw portion 43 and the inner circumferential screw portion 44 are determined so that the screws can be further fastened according to the rotational direction in the case of using the product.

Next, a plurality of rubber dampers 9 (six rubber dampers 9 in the present embodiment) are press-fitted into a plurality of holes 15 formed in the axial direction (six holes 15 formed in the axial direction in the present embodiment) which are provided on the side wall 12 of the rotor 7. Next, the ball bearing 5 is press-fitted into the inner circumference of the side wall 12 of the rotor 7. Therefore, the ball bearing 5, the rotor 7 and the plurality of rubber dampers 9 are integrated with each other into one body. After the rotor unit, in which the ball bearing 5, the rotor 7 and the plurality of rubber dampers 9 are integrated with each other into one body, has been press-fitted into the outer circumference of the sleeve portion 4 provided at the front end portion of the housing 1 of the compressor, the circlip 6 is engaged with the outer circumference of the sleeve portion 4 so as to fix the ball bearing 5. In this way, the rotor unit can be assembled to the outer circumference of the sleeve portion 4 of the housing 1 of the compressor.

Next, a plurality of protruding engaging portions 23 (six protruding engaging portions 23 in the present embodiment) protruding from the rear end face of the outer hub 21, on the inner circumferential side of which the inner hub 22 is formed by means of insert molding, are positioned to the recessed portions 39 of the plurality of rubber dampers 9 in the rotational direction and engaged with the hexagonal portion 34, which is formed on the front end face of the cylindrical boss portion 31 of the inner hub 22, with a fastening tool. Next, while the fastening tool is being lightly pushed onto the compressor side (to the right in the drawing), it is rotated in the screwing direction, so that the output disk 8 can be rotated in the screwing direction. Then, the inner circumferential screw portion 35 provided on the inner circumference of the cylindrical boss portion 31 of the inner hub 22 and the outer circumferential screw portion 43 provided on the outer circumference of the first engaging portion 41 of the connecting rod 10 are fastened to each other by a predetermined fastening axial force (a fastening torque). In this connection, directions of the screw grooves of the outer circumferential screw portion 43 and the inner circumferential screw portion 35 are determined so that the screws can be further fastened according to the rotational direction in the case of using the product.

After the inner circumferential screw portion 35 and the outer circumferential screw portion 43 have been fastened to each other, even when the plurality of protruding engaging portions (the damper portions) 23 are press-fitted into the rubber dampers 9 by a fastening axial force generated in the hexagonal portion 34, the output disk 8 can be moved to the right in FIG. 2 (in the axial direction) by a light force. When the inner hub 22 and the connecting rod 10 are screwed and fixed to the outer circumference of the forward end portion of the shaft 2, the compressor-pulley device can be connected to the compressor shaft 2.

(Method of Detaching of Embodiment)

Next, referring to FIGS. 1 and 2, a method of disconnecting the compressor-pulley device from the compressor of the present invention will be briefly explained as follows.

First, in the case of detaching the output disk 8 from the connecting rod 10, after the locking portion 45 of the width across flat of the connecting rod 10 has been fixed with the holding tool, the output disk 8 is rotated with the fastening tool so that it can be loosened from the connecting rod 10. In this way, the output disk 8 can be easily detached from the connecting rod 10 without an idle rotation of the connecting rod 10 and the compressor shaft 2. Next, in the case of detaching the connecting rod 10 from the compressor shaft 2, after the locking portion 40 of the width across flat of the shaft 2 has been fixed with the holding tool, the connecting rod 10 is rotated with the fastening tool so that it can be loosened from the shaft 2. In this way, the connecting rod 10 can be easily detached from the compressor shaft 2 without an idle rotation of the shaft 2.

(Action of the Embodiment)

Next, an action of the compressor-pulley device of the present embodiment will be briefly explained referring to FIGS. 1 to 3.

At the time of normal operation of the compressor-pulley device, the inner hub 22 of the output disk 8 is held under the condition that it can be driven. Accordingly, when the engine is set in motion, the crank shaft is rotated, and rotational power (torque) of the engine is transmitted to the cylindrical wall portion 11 of the rotor 7 via the crank pulley and the V-belt. Torque is transmitted to the rubber dampers 9 from the inner wall faces in the circumferential direction of the holes 15, which are formed in the axial direction, of the side wall portion 12 of the rotor 7. Further, torque is transmitted from the inner side faces of the recessed portions 39 of the rubber dampers 9 to the outer circumferential faces of the protruding engaging portions 23 of the outer hub 21. Due to the foregoing, the outer hub 21 is rotated. Therefore, the cylindrical boss portion 31 of the inner hub 22, which is formed in the outer hub 21 by means of insert molding, the outer ring 32 and the plurality of bridge portions 33 are also rotated.

Rotational power is transmitted from the inner hub 22 to the connecting rod 10 as follows. The inner circumferential screw portion 35 provided on the inner circumference of the cylindrical boss portion 31 of the inner hub 22 and the outer circumferential screw portion 43 provided on the outer circumference of the first engaging portion 41 of the connecting rod 10 are fastened to each other in a direction in which the fastening axial force can be strengthened by the rotational power of the engine. When the first stopper composed of the rear end face of the cylindrical boss portion 31 of the inner hub 22 and the first receiving mount face 46 of the connecting rod 10 becomes a receiving mount face of the inner circumferential screw portion 35 and the outer circumferential screw portion 43 in the rotational direction. Therefore, rotational power of the engine can be smoothly transmitted from the inner hub 22 to the connecting rod 10.

Rotational power is transmitted from the connecting rod 10 to the compressor shaft 2 as follows. The inner circumferential screw portion 44 provided on the inner circumference of the second engaging portion 42 of the connecting rod 10 and the outer circumferential screw portion 3 provided on the outer circumference of the forward end portion of the compressor shaft 2 are fastened to each other in a direction in which the fastening axial force can be strengthened by the rotational power of the engine. When the second stopper composed of the forward end face of the compressor shaft 2 and the second receiving mount face 47 of the connecting rod 10 becomes a receiving mount face of the inner circumferential screw portion 44 and the outer circumferential screw portion 3. Therefore, the rotational power of the engine can be smoothly transmitted from the inner hub 22 to the connecting rod 10.

Accordingly, the connecting rod 10 is rotated while following the rotation of the inner hub 22 of the output disk 8, and the compressor shaft 2 is rotated while following the rotation of the connecting rod 10. Therefore, the compressor compresses the refrigerant, which has been sucked from the evaporator, and discharges the thus sucked refrigerant gas, at a high temperature and a high pressure, toward the condenser. Accordingly, air-conditioning can be accomplished in the passenger's compartment in a vehicle such as an automobile.

In this case, when the compressor shaft 2 is locked by the occurrence of seizure of the compressor, the rotor 7 continues to rotate while the rotation of the output disk 8 is stopped. Therefore, an overload torque (For example, an impact torque, the intensity being 40 Nm.), the intensity of which is much higher than the normal transmission torque (For example, the intensity being 15 Nm.), is generated in the inner hub 22 of the output disk 8. That is, when a difference in torque, the intensity of which is higher than a setting value, is generated between the cylindrical boss portion 31 of the inner hub 22 of the output disk 8 and the outer ring 32, a plurality of breaking portions 37, which are provided in the root portion on the cylindrical boss 31 side of the bridge portion 33 of the inner hub 22, are given a strong force, that is, a portion, to which a high stress is given by torque transmission compared with the other portions, is given a strong force. Accordingly, the plurality of breaking portions 37 are damaged (broken).

Therefore, the cylindrical boss portion 31 of the inner hub 22 and the outer ring 32 are separated from each other. Accordingly, the rotor 7, the plurality of rubber dampers 9, the outer hub 21 of the output disk 8 and the outer ring 32 of the inner hub 22 are freely rotated with respect to the cylindrical boss portion 31. In this way, when a difference in torque, the intensity of which is not less than a setting value, is generated between the cylindrical boss portion 31 of the inner hub 22 and the outer ring 32, the breaking portions 37 provided in the bridge portion 33 are broken. That is, when the torque limiter mechanism operates as described above, the transmission of toque from the rotor 7 to the compressor shaft 2 is shut off. Accordingly, the power transmission path from the engine to the compressor shaft 2 is shut off.

In this connection, concerning the outer hub 21 of the output disk 8, which is separate from the cylindrical boss portion 31 of the inner hub 22 and is also separate from the broken inner diameter side of the bridge portion 33, the outer ring 32 of the inner hub 22 and the outer diameter side of the bridge portion 33, a plurality of breaking portions 37 are provided being inclined so that the diameter of the compressor side can be small with respect to the axial line parallel with the axis of the compressor shaft 2. Due to the above structure, the outer hub 21 of the output disk 8, the outer ring 32 of the inner hub 22 and the outer diameter side of the bridge portion 33 are not moved forward (to the left in FIG. 2) from the front end face of the cylindrical wall portion 11 of the rotor 7 and can be held on the inner diameter side from the cylindrical wall portion 11. Accordingly, the outer hub 21 of the output disk 8, the outer ring 32 of the inner hub 22 and the outer diameter side of the bridge portion 33 are rotated together with the plurality of rubber dampers 9 according to the rotation of the rotor 7.

(Characteristics of the Embodiment)

Figure 4:
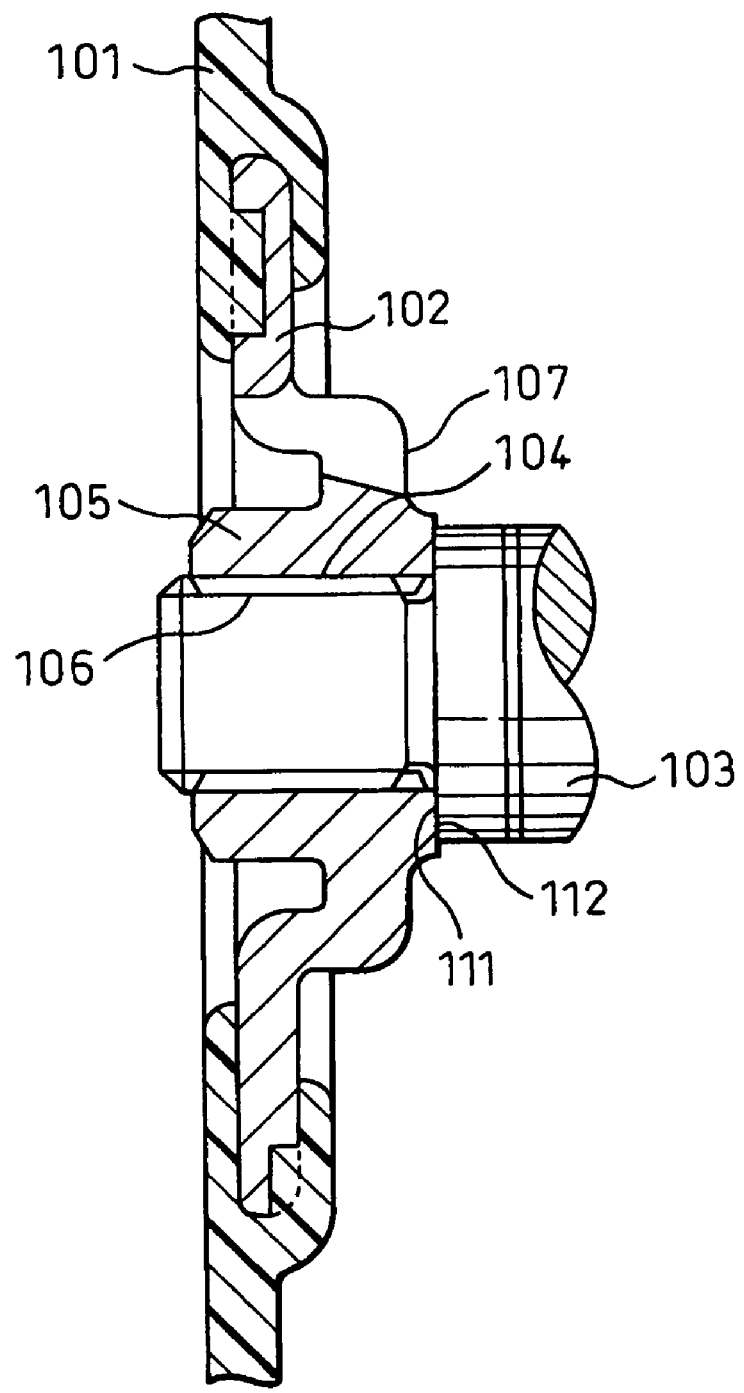
FIG. 4 is a sectional view showing a fastening profile of the prior art in which the inner hub and the shaft are fastened to each other.

In this case, as shown in FIG. 4, according to the prior art, the torque of the inner hub 102 is transmitted to the compressor shaft 103 as follows. First, the torque of the inner hub 102 is transmitted to the female screw portion 106 provided on the inner circumference of the cylindrical boss portion 105 of the inner hub 102. The female screw portion 106 is fastened to the male screw portion 104 provided on the outer circumference of the forward end portion of the compressor shaft 103 by the torque transmitted as described above. As the shoulder front end face 111 of the compressor shaft 103 and the boss portion rear end face 112 of the inner hub 102 compose a stopper, the shoulder front end face 111 of the shaft 103 becomes a receiving mount face of receiving the rotation of the screw portion. Therefore, rotational power of the engine can be transmitted from the cylindrical boss portion 105 of the inner hub 102 to the compressor shaft 103.

At this time, tension is given to the female screw portion 106 provided on the inner circumference of the cylindrical boss portion 105 of the inner hub 102 and the male screw portion 104 provided on the front end portion outer circumference of the compressor shaft 103. A compressive force is given to the stopper composed of the shoulder front end face 111 of the compressor shaft 103 and the boss portion rear end face 112 of the inner hub 102.

In the case of the compressor-pulley device of this embodiment, as shown in FIGS. 1 and 2, the inner circumferential screw portion 35 provided on the inner circumference of the cylindrical boss portion 31 of the inner hub 22 and the outer circumferential screw portion 43 provided on the outer circumference of the first engaging portion 41 of the connecting rod 10 are fastened to each other in the rotational direction so that the axial fastening force can be strengthened by the rotational power of the engine. When the first stopper (screw stopper), which is composed in such a manner that the rear end face of the cylindrical boss portion 31 of the inner hub 22 and the first receiving mount face 46 of the connecting rod 10 are butted on each other, becomes a receiving mount face in the rotational direction of the inner circumferential screw portion 35 and the outer circumferential screw portion 43, the rotational power of the engine can be transmitted from the inner hub 22 to the connecting rod 10.

When the rotational power is transmitted from the connecting rod 10 to the compressor shaft 2, the inner circumferential screw portion 44 provided on the inner circumference of the second engaging portion 42 of the connecting rod 10 and the outer circumferential screw portion 3 provided on the end outer circumference of the forward end portion of the compressor shaft 2 are fastened to each other in the rotational direction so that the axial fastening force can be strengthened by the rotational power of the engine. When the second stopper (screw stopper), which is composed in such a manner that the forward end face of the compressor shaft 2 and the second receiving mount face 47 of the connecting rod 10 are butted against each other, becomes a receiving mount face in the rotational direction of the inner circumferential screw portion 44 and the outer circumferential screw portion 3, the rotational power of the engine can be transmitted from the inner hub 22 to the connecting rod 10.

At this time, the inner circumferential screw portion (female screw portion) of the connecting rod 10 and the outer circumferential screw portion (male screw portion) of the compressor shaft 2 must be composed to be thinner than the outer diameter of the shaft 2 for the reason of assembling the compressor. However, when the connecting rod 10 is made of material of high strength (for example, stainless steel), the mechanical strength of which is higher than that of the material of the inner hub 22, it is possible to design that the outer diameter of the compressor shaft 2 is smaller than that of the connecting structure (the fastening profile) in which the cylindrical boss portion 105 of the inner hub 102 and the compressor shaft 103 are fastened to each other in the prior art.

Even if the outer diameter of the compressor shaft 2 is made to be smaller than that of the first engaging portion 41 of the connecting rod 10, as shown in FIGS. 1 and 2, as the connecting rod 10, which is made of material of higher strength than that of the inner hub 22, is incorporated into between the cylindrical boss portion 31 of the inner hub 22 and the compressor shaft 2, it is possible to ensure the mechanical strength of the fastening portion in which the cylindrical boss portion 31 of the inner hub 22 and the compressor shaft 2 are fastened to each other in the compressor-pulley device having the torque limiter mechanism. That is, it is possible to solve the problem of lack of the mechanical strength of the first receiving mount face 46 of the inner circumferential screw portion 35 and the outer circumferential screw portion 43 with respect to the axial fastening force (the fastening torque) of the inner circumferential screw portion 35 provided on the inner circumference of the cylindrical boss portion 31 of the inner hub 22 and the outer circumferential screw portion 43 provided on the outer circumference of the first engaging portion 41 of the connecting rod 10.

Further, it is possible to solve the problem of lack of the mechanical strength of the second receiving mount face 47 of the outer circumferential screw portion 3 and the inner circumferential screw portion 44 with respect to the axial fastening force (the fastening torque) of the outer circumferential screw portions 3, the outer circumference of the forward end portion of the compressor shaft 2 and the inner circumferential screw portion 44 provided on the inner circumference of the second engaging portion 42 of the connecting rod 10. Due to the foregoing, a sectional area of the compressor shaft 2 is decreased. Therefore, a force given to the shaft 2 in a direction in which the shaft 2 is pushed out from the front wall face of the housing 1 can be reduced. Accordingly, a load given to the thrust bearing, which is built in the compressor, can be reduced. Further, a contact area and sliding length of the shaft seal, which is built in the compressor, can be reduced. Accordingly, it is possible to decrease a power loss in the case of OFF operation of the refrigerating cycle.

As the fastening profile of fastening the cylindrical boss portion 31 of the inner hub 22 to the first engaging portion 41 of the connecting rod 10 is the same as that of the prior art, the assembling jig of the compressor-pulley device, which is a power transmission device of transmitting power to the shaft 103 of the compressor using refrigerant of fluorocarbon or chlorofluorocarbon such as HFC-134a, and the assembling jig of the compressor-pulley device, which is a power transmission device of transmitting power to the shaft 2 of the compressor using refrigerant of $CO_2$ of the present embodiment, can be used in common.

(Another Embodiment)

In the present embodiment explained above, the present invention is applied to a compressor pulley device which is belt-driven by an engine mounted on a vehicle such as an automobile. However, the present invention may be applied to a power transmission device which is belt-driven or is directly driven by an internal combustion engine laid at a constant position in a factory. In the present embodiment, the multiple state type V-belt pulley, which is called V-ribbed pulley, is used for the input disk. However, a V-belt pulley having one V-groove may be used for the input disk. In this case, a V-belt, the inner circumferential profile of which corresponds to the outer circumferential profile of the V-belt pulley, is used.

In the present embodiment explained above, the present invention is applied to a compressor pulley device (power transmission device) having a torque limiter mechanism, which is used for driving the compressor shaft 2 at all times, composing one component of the refrigerating cycle of an air-conditioner for vehicle use. However, the present invention may be applied to a power transmission device having a torque limiter mechanism which is used for driving other engine accessories such as an alternator, water pump, hydraulic pump, blower or fan at all times.

In the present embodiment, the connecting rod 10 is detached from the compressor shaft 2 by the locking portion 45 of the width across flats provided on the forward end face of the first engaging portion 41 of the connecting rod 10 and by the locking portion 40 of the width across flats provided in the shaft 2 protruding forward from the front wall face of the compressor housing 1. However, the connecting rod 10 may be detached from the compressor shaft 2 by a locking portion of the width across flats or the hexagonal hole provided in the shaft 2 protruding backward from the rear wall face of the compressor housing 1.

While the invention has been described by reference to specific embodiments chosen for purposes of illustration, it should be apparent that numerous modifications could be made thereto by those skilled in the art without departing from the basic concept and scope of the invention.

What is claimed is:

1. A power transmission device for transmitting rotational power from an engine to a drive shaft of an engine accessory, comprising:
    an annular hub member pivotally driven by the engine; and
    a connecting rod incorporated into between the drive shaft of the engine accessory and the hub member, made of material the mechanical strength of which is higher than that of the hub member, wherein
    the connecting rod includes a first screw portion screwed and fixed to an inner circumferential screw portion formed on an inner circumference of the hub member and also includes a second screw portion screwed and fixed to an outer circumferential screw portion formed on an outer circumference of a forward end portion of the drive shaft.

2. A power transmission device according to claim 1, wherein
    the hub member includes a cylindrical boss portion, which is provided on the inner circumferential side of the hub member, for fastening the hub member to the connecting rod,
    the connecting rod includes a first engaging portion engaged with the inner circumference of the cylindrical boss portion and also includes a second engaging portion, the profile of which is cylindrical with a bottom portion, wherein the second engaging portion is engaged with an outer circumference of a forward end portion of the drive shaft,
    the first screw portion is a male screw portion provided on an outer circumference of the first engaging portion, screwed to the inner circumferential screw portion, and
    the second screw portion is a female screw portion provided on an inner circumference of the second engaging portion, screwed to the outer circumferential screw portion.

3. A power transmission device according to claim 1, wherein
    the hub member includes a cylindrical boss portion, which is provided on the inner circumferential side, to be connected with the connecting rod,
    the connecting rod includes a first receiving mount face, the profile of which is substantially annular, engaging with the cylindrical boss portion so as to prevent the cylindrical boss portion from moving to one side in the axial direction, with which one end face of the cylindrical boss portion in the axial direction is closely contacted, and
    the connecting rod also includes a second receiving mount face, the profile of which is substantially annular, engaging with the drive shaft so as to prevent the drive shaft from moving to the other side in the axial direction, with which the other end face of the drive shaft in the axial direction is closely contacted.

4. A power transmission device according to claim 1, wherein
    the connecting rod includes a locking portion for preventing the connecting rod from rotating when the hub member is rotated in a direction in which the hub member is loosened with respect to the connecting rod, and
    when the hub member is detached from the connecting rod, the locking portion of the connecting rod is fixed with a holding tool and then the hub member is rotated with a fastening tool in a direction in which the hub member is loosened with respect to the connecting rod.

5. A power transmission device according to claim 1, wherein
    the drive shaft of the engine accessory includes a locking portion for preventing the drive shaft from rotating when the connecting rod is rotated in a direction in which the connecting rod is loosened with respect to the drive shaft, and
    when the connecting rod is detached from the drive shaft, the locking portion of the drive shaft is fixed with a holding tool and then the connecting rod is rotated with a fastening tool in a direction in which the connecting rod is loosened with respect to the drive shaft.

6. A power transmission device according to claim 1, further comprising:
an input disk pivotally driven by the engine,
an output disk, which serves as the hub member, wherein the output disk rotates in a predetermined rotational direction when the hub member receives rotational power from the engine; and
a torque limiter mechanism for shutting off a power transmission path from the input disk to the output disk when an overload torque is generated on the output disk.

7. A power transmission device according to claim 6, wherein
the output disk includes a metallic disk, the profile of which is a substantially annular plate, fastened and fixed to the first screw portion of the connecting rod and also includes a resin disk, the profile of which is a substantially annular plate, integrally formed on the outer circumferential side of the metallic disk,
the metallic disk includes a cylindrical boss portion provided on the inner circumferential side, fastened to the connecting rod, and
the inner circumferential screw portion of the hub member is provided on the inner circumference of the cylindrical boss portion of the metallic disk.

8. A power transmission device according to claim 6, wherein
the input disk includes a recessed engaging portion or a protruding engaging portion, to which at least a side end of the output disk is open, arranged in parallel with the drive shaft,
the output disk includes a protruding engaging portion or a recessed engaging portion loosely engaging with the recessed portion or the protruding portion, and
an elastic body made of rubber for absorbing a fluctuation of torque transmitted from the input disk to the output disk is interposed between an inner wall face of the recessed engaging portion and an outer wall face of the protruding engaging portion.

9. A power transmission device according to claim 1, wherein
the engine accessory is one or more of the compressor for circulating refrigerant in a refrigerating cycle, the alternator for electrically charging an electric power source mounted on a vehicle, the water pump for circulating cooling water in a cooling water circuit, the hydraulic pump for generating hydraulic pressure in a hydraulic control circuit or the lubricating circuit and the blower for generating an air current.

* * * * *